United States Patent [19]
Sakaguchi et al.

[11] 3,936,403
[45] Feb. 3, 1976

[54] SYNTHETIC RESIN COMPOSITION

[75] Inventors: Fumio Sakaguchi, Yokohama; Kenji Takemura, Kawasaki; Tadao Suzuki, Fujisawa; Isamu Yamazaki, Oita; Yoshifumi Nishibayashi, Sennan; Kazunobu Shiozawa, Izumisano; Toshimitsu Sasaki, Sennan, all of Japan

[73] Assignees: Showa Denko Kabushiki Kaisha, Tokyo; Toyo Cloth Co., Ltd., Sennan, both of Japan

[22] Filed: May 1, 1974

[21] Appl. No.: 466,048

[30] Foreign Application Priority Data
May 7, 1973   Japan.................................. 48-49828

[52] U.S. Cl. ..... 260/23 XA; 260/23 H; 260/23.7 M; 260/28.5 A; 260/30.4 R; 260/30.4 A; 260/30.6 R; 260/30.8 R; 260/31.2 R; 260/31.2 MR; 260/31.4 R; 260/31.6; 260/31.8 M; 260/32.6 A; 260/32.6 PQ; 260/33.2 R; 260/33.4 PQ; 260/42.29; 260/42.42; 260/42.44; 260/42.45; 260/42.46; 260/42.47; 260/42.49
[51] Int. Cl.$^2$...................... C08K 3/22; C08L 91/00
[58] Field of Search ....... 260/42.46, 897 C, 23.7 M, 260/23 XA, 28.5 A, 30.4 R, 30.4 A, 30.6 R, 260/30.8 R, 31.2 R, 31.2 MR, 31.4 R, 31.6, 260/32.6 A, 32.6 PQ, 33.2 R, 33.4 PQ, 260/42.29, 42.44, 42.42, 42.45, 42.47 31.8 M,

[56] References Cited
UNITED STATES PATENTS

| | | | |
|---|---|---|---|
| 3,563,939 | 2/1971 | Stevens et al. | 260/37 R |
| 3,600,335 | 8/1971 | Fukushima et al. | 260/897 C |
| 3,694,403 | 9/1972 | Aishima et al. | 260/41 R |
| 3,758,661 | 9/1973 | Yamamoto | 260/897 C |
| 3,780,141 | 12/1973 | Jin et al. | 260/897 C |

OTHER PUBLICATIONS

Sarvetnick, Harold A., Polyvinyl Chloride, Van Nostrand Reinhold Co., New York, 1969, pp. 67, 124 & 127.

*Primary Examiner*—James H. Derrington
*Attorney, Agent, or Firm*—Kemon, Palmer & Estabrook

[57] ABSTRACT

A synthetic resin composition which comprises 20 to 50 parts by weight of olefinic resins, 10 to 40 parts by weight of vinyl chloride resins, and 70 to 10 parts by weight of alumina trihydrate having a gibbsite crystal structure whose average particle size is 30 microns at most.

8 Claims, No Drawings

SYNTHETIC RESIN COMPOSITION

This invention relates to synthetic resin composition having excellent flameproofness and surface hardness. Mixture of 100 parts by weight of olefinic polymers such as ethylenic polymers or propylenic polymers with at least 100 parts by weight of various reinforcing inorganic fillers provides high modulus compositions as set forth in, for example, the Japanese Patent Publication Nos. 8037/65, 28199/71 and 29377/71 and the British Pat. No. 936,057.

However, compositions consisting of olefinic polymers and the aforesaid reinforcing inorganic fillers, for example, β-type alumina hydrates, as disclosed in said Japanese Patent Publication No. 8037/65, provide a high modulus product and indeed have great tensile strength and hardness, but low flexibility, tear strength and toughness. Where, however, there are used smaller proportions of an inorganic filler to eliminate the above-mentioned drawbacks, improvement is indeed attained in flexibility and tear strength but mixing cost rather increases, failing to provide an ecomonically advantageous product. Further, decreased incorporation of an inorganic filler naturally makes it necessary to use larger amounts of an olefinic polymer. Accordingly, product of such resin composition evolves considerable heat when subjected to combustion as rubbish after use. Moreover, such product undesirably gives forth large volumes of black smoke or soot during said combustion. What is worse, it is readily flammable and unadapted to be used as structural material.

For improvement on the defects of the above-mentioned resin composition, the present inventors found that a resin composition having prominent toughness, flame retardance, electrical insulation properties, and resistance to chemicals could be produced by blending ethylenic or propylenic polymers with a relatively large amount (40 to 93 per cent by weight based on the total weight of a resin composition) of α-type alumina trihydrate having a gibbsite crystal structure containing at least 0.20 per cent by weight of fixed sodium compounds expressed as $Na_2O$, as disclosed in our Japanese Patent Applications Nos. 28580/72 and 31757/72.

The resin compositions set forth in these patent applications exhibited the flexibility of olefinic polymers despite the inclusion of a relatively large amount of filler and not only had prominent mechanical properties such as tear strength but also presented an extremely homogeneous mixed state. However, said resin compositions were still found unsatisfactory despite such excellent properties, because the moldings of said resin compositions had too small a surface hardness to be used as structural material, for example, floors, walls, partitions, and ceilings or inner attachments to automotive wheels. For improvement on the surface hardness of moldings, it may be contemplated to laminate or paint another material on the surface of the moldings, or properly finish said surface by printing. However, any of these processes not only involves complicated steps but also undesirably increases the production cost of moldings.

In view of the above-mentioned circumstances, therefore, the object of this invention is to provide a synthetic resin composition whose moldings are prominent not only in surface hardness but also in flameproofness. The synthetic resin composition of this invention characteristically comprises 20 to 50 parts by weight of olefinic resins, 10 to 40 parts by weight of vinyl chloride resins and 70 to 10 parts by weight of alumina trihydrate having a gibbsite crystal structure whose average particle size is 30 microns at most.

As previously mentioned, moldings prepared from the synthetic resin composition of this invention are prominent not only in surface hardness and flameproofness but also in mechanical properties such as flexibility and tear strength, resistance to chemicals and electrical insulation properties.

It is well known that unless blended with another resin or rubber, olefinic resins (for example, ethylene homopolymer or propylene homopolymer) and vinyl chloride resins can not be mixed with good compatibility. However, incorporation of alumina trihydrate having a gibbsite crystal structure, as used in this invention, prominently improves the mixed condition of the above-mentioned olefinic and vinyl chloride resins, namely, the surface condition of moldings prepared from these two types of resins.

The present inventors have studied various types of olefinic resin compositions containing a large amount of inorganic filler and accomplished this invention by finding that a resin composition consisting of 20 to 50 parts by weight of olefinic resins, 10 to 40 parts by weight of vinyl chloride resins and 70 to 10 parts by weight of alumina trihydrate having a gibbsite crystal structure can provide moldings having prominent surface hardness.

The olefinic resins used in this invention include ethylenic resins and propylenic resins. The ethylenic resins include ethylene homopolymer, copolymers of at least 80 mol% of ethylene and 20 mol% at most of another α-olefin (for example, propylene, or butene-1) and copolymers of ethylene as a main component and a vinyl compound. Particularly preferred is high density polyethylene (permissively a copolymer of ethylene and 10 mol% at most of another α-olefin) having a melt index of 0.001 to 5 g/10 min. as measured at a temperature of 190°C and under a load of 2.16 kg. High density polyethylene is manufactured on an industrial scale, using a catalytic system (known as the Phillips or standard type catalyst) mainly consisting of a metal oxide or a catalytic system (known as the Ziegler type catalyst) mainly consisting of a transition metal compound and organo metal compound (generally organo aluminium compound) and is already widely applied in various fields.

On the other hand, the propylenic resins used in this invention include propylene homopolymer, copolymers (including block copolymers) of at least 80 mol% of propylene and 20 mol% at most of ethylene or another α-olefin (for example, butene-1), and copolymers of propylene as a main component and vinyl compounds or diolefins (for example, butadiene). Preferred is a propylenic polymer whose portion soluble in boiling n-heptane amounts to 40 % at most. Most desired is a propylenic polymer having a melt index of 20 g/10 min. as measured at a temperature of 230°C and under a load of 2.16 kg. These propylenic resins are manufactured on an industrial scale, using a catalytic system (known as the Ziegler-Natta type catalyst) mainly consisting of an organo metal compound (generally halogenated alkyl aluminium) and a transition metal compound (for example, titanium trichloride) or an eutectic mixture thereof (for example, a eutectic mixture of titanium trichloride and aluminium chloride [$TiCl_3.⅓ AlCl_3$]) and is already widely accepted in various fields.

The vinyl chloride resins used in this invention are generally known as polyvinyl chloride and widely manufactured on an industrial scale. The vinyl chloride resins include not only vinyl chloride homopolymer but also a copolymer of at least 85 mol% of vinyl chloride and another monomer. Said another monomer includes ethylene, vinylidene chloride, vinyl acetate and acrylic ester. Preferred is a vinyl chloride resin having a degree of polymerization of 850 to 1,800. Particularly desired is a type having a degree of polymerization of 1,000 to 1,400.

The alumina trihydrate having a gibbsite crystal structure [$\alpha$—Al(OH)$_3$] which is used in this invention has a monoclinic crystal system. Said trihydrate has a crystal structure in which the lattice constant is measured as $a = 8.62$ A, $b = 5.06$ A and $c = 9.70$ A, the beta($\beta$) angle is determined to be 85°26', and the refractive index is expressed as $\alpha= 1.568$, $\beta= 1.568$ and $\gamma= 1.567$. This alumina trihydrate is widely manufactured on an industrial scale (refer to the Japanese Patent Publication No. 5217/54). For the object of this invention, said alumina trihydrate has an average particle size of 30 microns at most, or preferably less than 10 microns. If the average particle size exceeds 30 microns, then it will be impossible to enable moldings prepared from a resin composition containing such trihydrate to have not only desired mechanical properties such as flexibility and rigidity but also to present a satisfactory surface appearance.

As previously mentioned, the synthetic resin composition of this invention comprises 20 to 50 parts by weight of olefinic resins, 10 to 40 parts by weight of vinyl chloride resins and 70 to 10 parts by weight of alumina trihydrate having a gibbsite crystal structure whose average particle size is 30 microns at most. However, said resin composition is preferred to comprise 20 to 40 parts by weight of olefinic resins, 10 to 20 parts by weight of vinyl chloride resins and 70 to 40 parts by weight of alumina trihydrate.

Where the proportion of olefinic resins included in the resin composition of this invention falls to below 20 parts by weight, then moldings prepared from such composition will not only lose a favorable feeling essentially derived from the olefinic resins, but also become brittle. Conversely, where the proportion of the olefinic resins rises above 50 parts by weight, then resultant moldings will undesirably not only fail to be improved in surface hardness, but also decrease in dimensional stability.

Where the proportion of vinyl chloride resins decreases from 10 parts by weight, then resultant moldings will fail to have satisfactory surface hardness. Conversely, where said proportion of vinyl chloride resins increases over 40 parts by weight, then resultant moldings will undesirably lose a good feeling.

Where alumina trihydrate is used in a smaller proportion than 10 parts by weight, then olefinic resins and vinyl chloride resins will not become well miscible, causing resulting moldings not only to present an irregular surface appearance, but also to decrease in selfextinguishing property. Conversely, a larger proportion of said trihydrate than 70 parts by weight will lead to the low flexibility and brittleness of resultant moldings.

In practical application, the synthetic resin composition of this invention is blended with plasticizers such as phthalic acid derivatives, adipic acid derivatives, azelaic acid derivatives, sebacic acid derivatives, maleic acid derivatives, fumaric acid derivatives, trimellitic acid derivatives, citric acid derivatives, oleic acid derivatives, ricinoleic acid derivatives, stearic acid derivatives, derivatives of other fatty acids, sulfonic acid derivatives, phosphoric acid derivatives, other monoester compounds, glycol derivatives, glycerin derivatives, paraffin derivatives, diphenyl derivatives, epoxy derivatives and polymerization type compounds; lubricants such as higher fatty acid esters, amide compounds and higher alcoholic compounds; and stabilizers such as metallic soaps, salts of inorganic acids and organotin compounds. These plasticizers, lubricants and stabilizers are used for common vinyl chloride resins.

Though varying with the proportions of vinyl chloride resins and olefinic resins included in the resin composition of this invention, the proportions of the above-mentioned plasticizers, lubricants and/or stabilizers are generally chosen to be 120 parts by weight at most based on 100 parts by weight of vinyl chloride resins for the plasticizers, 10 parts by weight at most based on 100 parts by weight of vinyl chloride resins for the lubricants and 10 parts by weight at most based on 100 parts by weight of vinyl chloride resins for the stabilizers. Though it may be considered advisable jointly to use the plasticizers and lubricants, yet it is preferred to further add a stabilizer to the subject resin composition in order to attain its stability.

The above-mentioned phthalic acid derivatives used as plasticizers typically include dimethyl phthalate, diethyl phthalate, dibutyl phthalate, diisobutyl phthalate, diamyl phthalate, dihexyl phthalate, butyl octyl phthalate, butyl isodecyl phthalate, butyl lauryl phthalate, di-(2-ethylhexyl) phthalate, di-n-octyl phthalate, butyl coconut alkyl phthalate, dilauryl phthalate, diheptyl phthalate, diisooctyl phthalate, octyl decyl phthalate, n-octyl.n-decyl phthalate, diisodecyl phthalate, ditridecyl phthalate, ethyl hexyl decyl phthalate, dinonyl phthalate, butyl benzyl phthalate, dicyclohexyl phthalate, diallyl phthalate, dimethoxyethyl phthalate, dibutoxyethyl phthalate, methyl phthalyl ethyl glycolate and butyl phthalyl butyl glycolate.

The adipic acid derivatives used as plasticizers typically include di-n-butyl adipate, diisobutyl adipate, di-(2-ethylhexyl) adipate, diisooctyl adipate, diisodecyl adipate, octyl decyl adipate, dicapryl adipate, benzyl-n-butyl adipate, polypropylene adipate, dibutoxyethyl adipate and benzyl octyl adipate.

The azelaic acid derivatives used as plasticizers typically include di-(2-ethylhexyl) azelate, diisooctyl azelate, di-2-ethylhexyl-4-thioazelate, di-n-hexyl azelate and diisobutyl azelate.

The sebacic acid derivatives used as plasticizers typically include dimethyl sebacate, dibutyl sebacate, di-(2-ethylhexyl) sebacate, and diisooctyl sebacate.

The maleic acid derivatives used as plasticizers typically include di-n-butyl maleate, dimethyl maleate, di-(2-ethylhexyl) maleate and dinonyl maleate.

The fumaric acid derivatives used as plasticizers typically include dibutyl fumarate and di-(2-ethylhexyl) fumarate.

The trimellitic acid derivatives used as plasticizers typically include tri-(2-ethylhexyl) trimellitate, triisodecyl trimellitate, n-octyl.n-decyl trimellitate, triisooctyl trimellitate and diisooctyl monoisodecyl trimellitate.

The citric acid derivatives used as plasticizers typically include triethyl citrate, tri-n-butyl citrate, acetyl triethyl citrate, acetyl tri-n-butyl citrate, acetyl tri-n- octyl n-decyl citrate and acetyl tri-(2-ethylhexyl) citrate.

The oleic acid derivatives used as plasticizers typically include methyl oleate, butyl oleate, methoxyethyl oleate, tetrahydrofurfuryl oleate, glyceryl oleate and diethylene glycol monooleate.

The ricinoleic acid derivatives used as plasticizers typically include methyl acetyl ricinoleate, butyl acetyl ricinoleate, glyceryl monoricinoleate, diethylene glycol monoricinoleate, glyceryl tri-(acetyl ricinoleate) and alkyl acetyl ricinoleate.

The stearic acid derivatives used as plasticizers typically include n-butyl stearate, glyceryl monostearate, diethylene glycol distearate and chlorinated methyl stearate.

Other fatty acid derivatives used as plasticizers typically include diethylene glycol dipelargonate, diethylene glycol monolaurate and butyl cellosolve pelargonate.

The sulfonic acid derivatives used as plasticizers typically include benzene sulfonic acid butylamide, O-toluene sulfonamide, N-ethyl-p-toluene sulfonamide, O-toluene ethyl sulfonamide and N-cyclohexyl-p-toluene sulfonamide.

The phosphoric acid derivatives used as plasticizers typically include triethyl phosphate, tributyl phosphate, tri-(2-ethylhexyl) phosphate, triphenyl phosphate, cresyl diphenyl phosphate, tricresyl phosphate, tritolyl phosphate, trixylyl phosphate, tris (chloroethyl) phosphate, diphenyl mono-O-xenyl phosphate and diphenyl xylenyl phosphate. Other monoester compounds used as plasticizers typically include diphentaerythritol ester and fatty acid esters of pentaerythritol.

The glycol derivatives used as plasticizers typically include triethylene glycol di-(2-ethylbutyrate), triethylene glycol di-(2-ethylhexoate), dibutyl methylene bis-thioglycolate, polyethylene glycol and polyglycol ether.

The glycerin derivatives used as plasticizers typically include glycerol monoacetate, glycerol diacetate, glycerol tributyrate, glycerol tripropionate and glycerol ether acetate.

The epoxy derivatives used as plasticizers are broadly divided into epoxidized unsaturated fats and oils, epoxidized unsaturated fatty acid esters and epoxidized cyclohexane derivatives.

The polymerization type compounds used as plasticizers typically include polyesters having a molecular weight of 1,000 to 8,000, polyethers having a viscosity of 600 to 1,000 centipoises at 25°C, and acrylonitrile-butadiene copolymer.

The higher fatty acid esters used as lubricants typically include butyl stearate and methyl hydroxystearate.

The amide compounds used as lubricants typically include stearoamide, methylene bis-stearoamide, hydroxy stearic acid ethylene diamide, hydroxystearic acid methylolamide, hydroxystearic acid oleylamide and hydroxystearic acid erucylamide.

The higher alcohol compounds used as lubricants typically include stearyl alcohol. Other lubricants include high melting wax.

The metallic soaps used as stabilizers typically include lithium stearate, magnesium stearate, calcium stearate, calcium chlorostearate, calcium laurate, strontium stearate, barium stearate, barium chlorostearate, barium laurate, barium 2-ethylhexylate, barium ricinoleate, zinc stearate, zinc laurate, cadmium stearate, cadmium laurate, cadmium ricinoleate, lead stearate, dibasic lead stearate, lead 2-ethylhexylate, tribasic lead maleate, dibasic lead phthalate and lead salicylate.

The salts of inorganic acids used as stabilizers typically include alkyl aryl cadmium phosphite, basic lead silicate, tribasic lead sulfate, basic lead sulfite and dibasic lead phosphite.

The organotin compounds used as stabilizers typically include dibutyl tin dilaurate, dibutyl tin maleate, dibutyl tin laurate-maleate complex, dimethyl tin compounds, actyl tin compounds and stamic diol derivatives.

The above-listed plasticizers, lubricants and stabilizers are already commercially available generally in the form blended with vinyl chloride resins. Such marketed vinyl chloride resins may be directly used as a component of the synthetic resin composition of this invention.

Where the above-mentioned additives to vinyl chloride resins are used in a larger proportion than 120 parts by weight based on 100 parts by weight of vinyl chloride resins, then the resultant resin composition will undesirably present a sticky state.

Though it is possible to use only one kind of the aforesaid plasticizers, lubricants and stabilizers respectively, yet it is generally preferred to use two or more kinds of these respective additives.

The synthetic resin composition of this invention may be prepared by first mixing two or three components of olefinic resins, vinyl chloride resins, alumina trihydrate and additives to the vinyl chloride resins and thereafter adding the remaining component or components. However, it is also possible to mix together all said four components at once. It is advised to carry out said mixing by a mechanical mixing process using a roll mill, Banbury mixer or melt extruder commonly used in the synthetic resin industry.

The synthetic resin composition of this invention prepared by mixing the components by any of the above-mentioned processes can be formed into various forms such as films, boards, sheets, pipes, rods, etc. by means of, for example, calender molding, injection molding or extrusion molding. However, the temperature at which final moldings are manufactured is desired to range between 150° and 300°C, or most preferably between 180° and 250°C.

Moldings prepared from the synthetic resin composition of this invention are not only excellent in mechanical properties such as impact resistance and flexibility despite inclusion of a relatively large amount of alumina trihydrate, but also have prominent heat stability and are moreover flame retardant. Further, since the subject resin composition contains a small proportion of olefinic resins, moldings thereof not only evolve relatively small volumes of black smoke (soot) when fired for dumping after use, but also release little heat.

Moldings of the synthetic resin composition of this invention can be bonded with metals such as aluminium, iron, copper and tin, alloys thereof (for example, brass and stainless steel), cellulosic materials such as paper, fibers and wood and inorganic materials such as stone, gypsum plaster and cement by interposing an adhesive material between both groups of objects of bonding or by previously incorporating adhesive compounds such as unsaturated carboxylic acid or organic peroxide in the subject resin composition itself.

The above-mentioned unsaturated carboxylic acid in liquid form includes acrylic acid, methacrylic acid and monomethyl 2-methylene glutarate. The unsaturated carboxylic acid in solid form includes crotonic acid, maleic acid, fumaric acid, itaconic acid, 2-methylene glutaric acid and citraconic acid.

Though addition of 0.1 to 4.0 parts by weight of said unsaturated carboxylic acid, whether in liquid or solid form, to the resin composition of this invention based on 100 parts by weight thereof appreciably improves the adhesivity of said composition, yet further incorporation of 0.01 to 0.2 part by weight of organic peroxide based on 100 parts by weight of the subject resin composition more prominently elevates its adhesivity. Firm bonding between moldings of said resin composition and the articles of other materials can be effected by coating the liquid unsaturated carboxylic acid on the surface of the moldings of said resin composition at the rate of 1 to 2 mg/cm$^2$, followed by heating and pressure. However, application of the aforesaid proportion of organic peroxide to the subject resin composition in addition to the liquid unsaturated carboxylic acid noticeably increases the adhesivity of said resin composition.

The above-mentioned peroxide includes ketone peroxide such as 1,1-bis-tert-butyl peroxy-3,3,5-trimethyl cyclohexane; hydroperoxide such as 2,5-dimethyl hexane-2,5-dihydroperoxide; dialkyl peroxide such as dicumyl peroxide; diacyl peroxide such as benzoyl peroxide; and peroxyester such as 2,5-dimethyl-2,5-dibenzoyl peroxyhexane.

Moldings of the resin composition of this invention and the articles of other materials can be properly bonded together by applying a temperature of 140° to 180°C and a low pressure for 2 to 10 minutes. In this case, the articles of other materials may take various forms such as films, sheets, foils, fabrics, powders, boards, pipes, rod, etc.

Depending on the uses of moldings of the resin composition, the resin composition of this invention normally comprising olefinic resins, vinyl chloride resins and alumina trihydrate and, if required, additives to said vinyl chloride resins may be blended with other resins. Further, the resin composition of this invention may contain other additives generally used with olefinic resins, such as a stabilizer to light (ultraviolet ray), oxygen, ozone and heat, flame retardant, inhibitor of deterioration by metal (for example, copper inhibitor), reinforcing agent, filler, plasticizer, coloring agent, colorability promotor, antistatic agent, decomposition accelerator and electric property improver.

Moldings prepared from the synthetic resin composition of this invention are excellent, as previously described, not only in surface hardness and flame retardance, but also heat stability and flexibility, and can be favorably used in wide fields in various forms, for example, in the form of sheets or boards or a combination thereof as outer structural members and materials for automobiles, shipping and industrial applications.

This invention will be more fully understood by reference to the examples and controls which follow. Throughout the examples and controls, the surface hardness of moldings was determined by the pencil scratch test specified in the Japanese Industrial Standard (JIS) K 5400. Namely, said determination was made on a pencil scratch tester which was designed to indicate the surface hardness of moldings in the maximum hardness of the lead of a pencil which could scratch the surface of a sample molding under a load of 50 g without marking any scar thereon. The selfextinguishing property was determined on the basis of the oxygen index pursuant to the JIS K 7201. The tear strength was determined by obtaining the Elemendorf value according to the JIS P 8116. The feeling was expressed in the terms "dry," "sticky," "soft" and "hard" used in denoting the senses experimentally derived from the hand touch in conjunction with the corresponding values of the Sward rocker hardness. Namely, the Sward rocker hardness was determined according to the JIS K 5640 on the basis of 50 shakings of the Sward rocker on the standard glass plate which was taken as the Sward rocker hardness of 100. The dimensional stability was tested by cutting off a piece 150 mm long and 6 mm wide from a sheet-like sample molding at room temperature, leaving the cut piece 10 minutes in a circulating thermostat at 120°C and thereafter cooling the piece with ice and determining the ratio which the extension or shrinkage of the piece bears to the original length of 150 mm. The peel strength of the bonded mass was determined by peeling them through an angle of 180° at a tensile speed of 100 mm/min. pursuant to ASTM D903-49.

EXAMPLE 1

25 parts by weight of high density polyethylene having a density of 0.94 g/cc and a melt index of 0.05 g/10 min. as measured at a temperature of 190°C and under a load of 2.16 kg (manufactured by Showa Yuka K.K. under a trade name "Sholex"), 50 parts by weight of alumina trihydrate having a gibbsite crystal structure with an average particle size of 6 microns and 25 parts by weight of polyvinyl chloride containing 25 % by weight of dioctyl phthalate (said polyvinyl chloride contains 5 mol% of ethylene and has an average degree of polymerization of 1050.) were kneaded together about 5 minutes on an 8-inch mixing roll whose surface temperature was set at 160°C to provide a sheet 0.2 mm thick. A pencil scratch test made of the surface hardness of said sheet showed that the surface hardness of said sheet was a pencil hardness of the B grade. The sheet indicated desirably small changes in dimensional stability, as −0.33 % in the longitudinal direction (the direction in which the mixing roll rotated in forming the sheet) and +0.05 % in the lateral direction. The sheet was selfextinguishing with an oxygen index of 22.1 and had a tear strength of 7.3 kg/cm in the longitudinal direction and a tear strength of 5.5 kg/cm in the lateral direction. Further the sheet satisfactorily felt "soft and dry" with a Sward rocker hardness of 8.

CONTROL 1

55 parts by weight of high density polyethylene, 40 parts by weight of alumina trihydrate and 5 parts by weight of polyvinyl chloride all of the same kind as in Example 1 were kneaded together in the same manner as in Example 1 to form a sheet. The pencil scratch test showed that the sheet had a surface hardness of the 4B grade expressed in the hardness of the lead of the pencil. Further, the sheet presented prominent variations in dimensional stability, namely, −5.4 % in the longitudinal direction and −2.1 % in the lateral direction.

CONTROL 2

47 parts by weight of high density polyethylene, 8 parts by weight of alumina trihydrate and 45 parts by weight of polyvinyl chloride all of the same kind as in Example 1 were kneaded together in the same manner as in Example 1 to provide a sheet. The sheet was flammable with an oxygen index of 19.2. Further, the sheet undesirably felt rigid with a Sward rocker hardness of 16.

CONTROL 3

15 parts by weight of high density polyethylene, 75 parts by weight of alumina trihydrate and 10 parts by weight of polyvinyl chloride all of the same kind as in Example 1 were kneaded together in the same manner as in Example 1 to form a sheet. The sheet was brittle with a tear strength of 0.8 kg/cm in the longitudinal direction and a tear strength of 0.5 kg/cm in the lateral direction.

EXAMPLE 2

The polyvinyl chloride of Example 1 containing dioctyl phthalate was replaced by the type containing 5 % by weight of glyceryl monostearate. Thus substantially the same three components as in Example 1 were kneaded together in the same manner as shown in Example 1 to provide a sheet. The sheet had a surface hardness of the H grade expressed in the hardness of the lead of the pencil in the pencil scratch test. Further, the sheet was selfextinguishing with an oxygen index of 23.6 and had a tear strength of 5.3 kg/cm in the longitudinal direction and a tear strength of 4.8 kg/cm in the lateral direction. The sheet desirably felt "dry and soft" with a Sward rocker hardness of 6.

EXAMPLE 3

The polyvinyl chloride in Example 1 containing dioctyl phthalate was replaced by the type containing 1.5 % by weight of calcium stearate. Thus substantially the same three components as in Example 1 were kneaded together in the same manner as in Example 1 to provide a sheet. The sheet had a surface hardness of the H grade expressed in the hardness of the lead of the pencil in the pencil scratch test. The sheet indicated small changes in dimensional stability, as −0.29 % in the longitudinal direction and +0.05 % in the lateral direction. Further, the sheet was selfextinguishing with an oxygen index of 23.6, and had a tear strength of 8.2 kg/cm in the longitudinal direction and a tear strength of 6.6 kg/cm in the lateral direction. The sheet also felt "dry" with a Sward rocker hardness of 8.

EXAMPLE 4

Kneading was carried out in the same manner as in Example 1 to form a sheet, excepting that the polyvinyl chloride used in Example 1 was replaced by the type which did not contain dioctyl phthalate. The sheet thus prepared had a surface hardness of the 2H grade expressed in the hardness of the lead of the pencil in the pencil scratch test. The sheet desirably indicated small changes in dimensional stability as −0.25 % in the longitudinal direction and +0.05 % in the lateral direction. The sheet was also selfextinguishing with an oxygen index of 24.1 and a tear strength of 8.5 kg/cm in the longitudinal direction and a tear strength of 6.2 kg/cm in the lateral direction. The sheet favorably felt "soft and dry" with a Sward rocker hardness of 8.

EXAMPLE 5

The high density polyethylene of Example 1 was replaced by crystalline propylene homopolymer having a density of 0.89 g/cc, melt flow index of 2.0 g/10 min. as measured at a temperature of 230°C and under a load of 2.16 kg and containing 17 % of boiling n-heptane-soluble portion (manufactured by Showa Yuka K.K. under a trade name "Shoallomer"). Thus substantially the same three components as in Example 1 were kneaded together in the same manner as in Example 1 to form a sheet. The sheet had a surface hardness of the 2H grade expressed in the hardness of the lead of the pencil in the pencil scratch test. The sheet presented small changes in dimensional stability, as −0.05 % in the longitudinal direction and +0.05 % in the lateral direction. The sheet was self-extinguishing with an oxygen index of 22.4, and had a tear strength of 2.9 kg/cm in the longitudinal direction and a tear strength of 2.1 kg/cm in the lateral direction. The sheet desirably felt "dry" with a Sward rocker hardness of 8.

EXAMPLE 6

35 parts by weight of high density polyethylene, 50 parts by weight of alumina trihydrate and 15 parts by weight of polyvinyl chloride, all used in Example 1, were kneaded together in the same manner as in Example 1 to form a sheet. The sheet had a surface hardness of the B grade expressed in the hardness of the lead of the pencil in the pencil scratch test. The sheet indicated small variations in dimensional stability, as −0.05 % in the longitudinal direction and +0.05% in the lateral direction. The sheet was self-extinguishing with an oxygen index of 22.4, and had a tear strength of 9.7 kg/cm in the longitudinal direction and a tear strength of 7.6 kg/cm in the lateral direction. The sheet favorably felt "dry" with a Sward rocker harndess of 10.

EXAMPLE 7

25 parts by weight of high density polyethylene used in Example 1, 60 parts by weight of alumina trihydrate used in Example 1 and 15 parts by weight of vinyl chloride homopolymer having an average degree of polymerization of 1400 were kneaded together in the same manner as in Example 1 to form a sheet. The sheet had a surface hardness of the H grade expressed in the hardness of the lead of the pencil in the pencil scratch test. The sheet showed small changes in dimensional stability, as −0.21 % in the longitudinal direction and +0.05 % in the lateral direction. The sheet was selfextinguishing with an oxygen index of 23.5 and had a tear strength of 7.0 kg/cm in the longitudinal direction and a tear strength of 4.5 kg/cm in the lateral direction. The sheet desirably felt "dry" with a Sward rocker hardness of 6.

EXAMPLE 8

45 parts by weight of high density polyethylene, 40 parts by weight of alumina trihydrate and 15 parts by weight of polyvinyl chloride, all used in Example 1, were kneaded together in the same manner as in Example 1 to provide a sheet. The sheet had a surface hardness of the H grade expressed in the hardness of the lead of the pencil in the pencil scratch test. The sheet indicated small variations in dimensional stability, as −0.54 % in the longitudinal direction and +0.05 % in the lateral direction. The sheet was selfextinguishing with an oxygen index of 20.2, and had a tear strength of 8.4 kg/cm in the longitudinal direction and a tear strength of 5.6 kg/cm in the lateral direction. The sheet favorably felt "dry" with a Sward rocker hardness of 10.

EXAMPLE 9

40 parts by weight of high density polyethylene, 40 parts by weight of alumina trihydrate and 20 parts by weight of polyvinyl chloride, all used in Example 1, were kneaded together in the same manner as in Example 1 to form a sheet. The sheet had a surface hardness of the 2B grade expressed in the hardness of the lead of the pencil in the pencil scratch test. The sheet presented small variations in dimensional stability, as −0.54 % in the longitudinal direction and +0.05 % in the lateral direction. The sheet was selfextinguishing with an oxygen index of 20.7, and had a tear strength of 6.3 kg/cm in the longitudinal direction and a tear strength of 3.1 kg/cm in the lateral direction. The sheet desirably felt "dry" with a Sward rocker hardness of 10.

EXAMPLE 10

33.3 parts by weight of high density polyethylene having a density of 0.95 g/cc and a melt index of 0.03 g/10 min, 33.3 parts by weight of alumina trihydrate used in Example 1 and 33.3 parts by weight of polyvinyl chloride used in Example 1, were kneaded together in the same manner as in Example 1 to provide a sheet. The sheet had a surface hardness of the B grade expressed in the hardness of the lead of the pencil in the pencil scratch test. The sheet showed small changes in dimensional stability, as −1.2 % in the longitudinal direction and −0.09 % in the lateral direction. The sheet was selfextinghishing with an selfextinguishing index of 21.0, and had a tear strength of 6.0 kg/cm in the longitudinal direction and a tear strength of 3.9 kg/cm in the lateral direction. The sheet desirably felt "dry" with a Sward rocker hardness of 10.

EXAMPLE 11

30 parts by weight of high density polyethylene, 40 parts by weight of alumina trihydrate and 30 parts by weight of polyvinyl chloride, all used in Example 1, were kneaded together in the same manner as in Example 1 to form a sheet. The sheet had a surface hardness of the HB grade expressed in the hardness of the lead of the pencil in the pencil scratch test. The sheet presented small variations in dimensional stability, as −0.55 % in the longitudinal direction and +0.05 % in the lateral direction. The sheet was selfextinguishing with an oxygen index of 21.5, and had a tear strength of 5.1 kg/cm in the longitudinal direction and a tear strength of 2.3 kg/cm in the lateral direction. The sheet favorably felt "soft" with a Sward rocker hardness of 8.

EXAMPLE 12

25 parts by weight of high density polyethylene, 55 parts by weight of alumina trihydrate and 20 parts by weight of polyvinyl chloride, all used in Example 1, were kneaded together in the same manner as in Example 1 to form a sheet. The sheet had a surface hardness of the HB grade expressed in the hardness of the lead of the pencil in the pencil scratch test. The sheet indicated small variations, as −0.19 % in the longitudinal direction and +0.05 % in the lateral direction. The sheet was selfextinguishing with an oxygen index of 23.0, and had a tear strength of 5.3 kg/cm in the longitudinal direction and a tear strength of 2.3 kg/cm in the lateral direction. The sheet satisfactorily felt "dry" with a Sward rocker hardness of 8.

EXAMPLE 13

The polyvinyl chloride used in Example 1 was replaced by the type containing 40 % by weight of dioctyl phthalate. Thus substantially the same three components as in Example 1 were kneaded together in the same manner as in Example 1 to provide a sheet. The sheet had a surface hardness of the 2B grade expressed in the hardness of the lead of the pencil in the pencil scratch test. The sheet was selfextinguishing with an oxygen index of 22.0, and had a tear strength of 8.0 kg/cm in the longitudinal direction and a tear strength of 6.0 kg/cm in the lateral direction. The sheet desirably felt "soft" with a Sward rocker hardness of 6.

EXAMPLE 14

The polyvinyl chloride used in Example 1 was replaced by the type containing 25 % by weight of dioctyl phthalate and 3 % by weight of butyl stearate. Thus substantially the same three components as in Example 1 were kneaded together in the same manner as in Example 1 to form a sheet. The sheet had a surface hardness of the B grade expressed in the hardness of the lead of the pencil in the pencil scratch test. The sheet showed small variations in dimensional stability, as −0.30 % in the longitudinal direction and +0.10 % in the lateral direction. The sheet was selfextinguishing with an oxygen index of 22.1, and had a tear strength of 7.5 kg/cm in the longitudinal direction and a tear strength of 6.0 kg/cm in the lateral direction. The sheet satisfactorily felt "soft and dry," with a Sward rocker hardness of 6.

EXAMPLE 15

25 parts by weight of high density polyethylene having a density of 0.96 g/cc and a melt index of 1.5 g/10 min, 50 parts by weight of alumina thrihydrate having an average particle size of 1.2 microns and 25 parts by weight of polyvinyl chloride used in Example 1 were kneaded together in the same manner as in Example 1 to form a sheet. The sheet had a surface hardness of the HB grade expressed in the hardness of the lead of the pencil in the pencil scratch test. The sheet indicated small changes in dimensional stability, as −0.29 % in the longitudinal direction and +0.04 % in the lateral direction. The sheet was selfextinguishing with an oxygen index of 23.1, and had a tear strength of 9.3 kg/cm in the longitudinal direction and a tear strength of 7.2 kg/cm in the lateral direction. The sheet desirably felt "dry" with a Sward rocker hardness of 8.

EXAMPLE 16

Kneading was carried out in the same manner as in Example 1, excepting that the resin composition of Example 1 was further blended with 3 parts by weight of fumaric acid, thereby forming a sheet about 3.0 mm thick. The sheet was placed between two 0.08 mm thick aluminium foils (JIS H-4191) whose surface was previously washed and degreased by trichloroethylene. The superposed mass was pressed together for 5 minutes at a temperature of 160°C and a pressure of 50 kg/cm$^2$, followed by cooling to room temperature using a water-cooled press at a pressure of 50 kg/cm$^2$. The bonded mass thus obtained had a peel strength of 9.3 kg/2.5 cm width.

EXAMPLE 17

Kneading was effected in the same manner as in Example 16 to form a sheet, excepting that the amounts of high density polyethylene, alumina trihydrate and polyvinyl chloride used in Example 16 were changed to 20, 70 and 10 parts by weight respectively. The sheet was placed between two aluminium foils of the same type as in Example 16, followed by compression under heat in the same manner as in Example 16. The bonded mass had a peel strength of 8.3 kg/2.5 cm width.

EXAMPLE 18

The resin composition of Example 16 which was further blended with 0.05 part by weight of dicumyl peroxide was kneaded in the same manner as in Example 16 to form a sheet. The sheet was placed between two aluminium foils of the same type as in Example 16, followed by compression under heat in the same manner as in Example 16. The bonded mass had a peel strength of 11.5 kg/2.5 cm width.

EXAMPLE 19

The two aluminium foils used in Example 16 were replaced by two 0.2 mm thick galvanized sheets whose surface was previously degreased by trichloroethylene. A sheet obtained by kneading the resin composition of Example 16 was placed between said galvanized sheets. The superposed mass was pressed together under heat in the same manner as in Example 16. The bonded mass had a peel strength of 8.5 kg/2.5 cm width.

EXAMPLE 20

The two aluminium foils used in Example 16 were replaced by two pieces of kraft paper. A sheet obtained by kneading the resin composition of Example 16 was placed between said pieces of kraft paper. The superposed mass was pressed together under heat in the same manner as in Example 16. The bonded mass had a peel strength of 8.5 kg/2.5 cm width. (The kraft paper was torn off due to the firm bonding of said superposed mass.)

What we claim is:

1. A synthetic resin composition capable of forming moldings with good surface hardness and flame resistance consisting essentially of 20 to 50 parts by weight of olefinic resin, 10 to 40 parts by weight of vinyl chloride resin and 70 to 10 parts by weight of alumina trihydrate of the formula $\alpha$-Al(OH)$_3$ with a gibbsite crystal structure in which the lattice constant is measured as $a = 8.62$A, $b = 5.06$A and $c = 9.70$A, the $\beta$ (B) angle is determined to be 85°26' and the refractive index is expressed as $\alpha = 1.568$, $\beta = 1.568$ and $\gamma = 1.567$ and which has an average particle size under 30 microns, said olefinic resin being selected from the group consisting of ethylene homopolymer, copolymers formed of at least 80 mol% ethylene and not over 20 mol% of other $\alpha$-olefin, propylene homopolymers and copolymers formed of at least 80 mol% propylene and not over 20 mol% of other $\alpha$-olefin or diolefin, and said vinyl chloride resin being selected from the group consisting of vinyl chloride polymer and mixtures thereof with up to 120 parts by weight of plasticizer, up to 10 parts by weight of lubricant and up to 10 parts by weight of stabilizer per 100 parts of vinyl chloride polymer, said vinyl chloride polymer having a degree of polymerization between about 850 to 1,800 and being selected from the group consisting of vinyl chloride homopolymer and copolymers formed of at least 85 mol% vinyl chloride with ethylene, vinylidene chloride, vinyl acetate or acrylic ester.

2. A synthetic resin composition according to claim 1 wherein said alumina trihydrate contains at least 0.20 percent by weight of fixed sodium compounds expressed as Na$_2$O.

3. The composition of claim 1 wherein said olefinic resin is high density polyethylene having a melt index of 0.001 to 5 g/10 min. measured at 190°C under a load of 2.16 kg.

4. The composition of claim 1 wherein said olefinic resin is polypropylene having a melt index of about 20 g/10 min. measured at 230°C under a load of 2.16 kg.

5. The composition of claim 1 which contains 0.1 to 4.0 parts by weight of unsaturated carboxylic acid based on 100 parts by weight of said resin composition.

6. The composition of claim 1 which contains 0.01 to 0.2 parts by weight of organic peroxide based on 100 parts by weight of said resin composition.

7. A synthetic resin composition according to claim 5 wherein the unsaturated carboxylic acid is one selected from the group consisting of acrylic acid, methacrylic acid, monomethyl 2-methylene glutarate, crotonic acid, maleic acid, fumaric acid, itaconic acid, 2-methylene glutaric acid and citraconic acid.

8. A synthetic resin composition according to claim 6 wherein the organic peroxide is one selected from the group consisting of ketone peroxide, hydroperoxide, dialkyl peroxide, diacyl peroxide and peroxyester.

* * * * *